(12) United States Patent
Mercer et al.

(10) Patent No.: US 11,488,490 B2
(45) Date of Patent: Nov. 1, 2022

(54) SERVER, SYSTEM, AND METHOD FOR IMMERSIVE TRAINING

(71) Applicant: Vantage Point, Los Angeles, CA (US)

(72) Inventors: Morgan Rae Mercer, Los Angeles, CA (US); Christopher Charles Van Norman, Section, AL (US)

(73) Assignee: Vantage Point, Los Angeles, CA (US)

( * ) Notice: Subject to any disclaimer, the term of this patent is extended or adjusted under 35 U.S.C. 154(b) by 267 days.

(21) Appl. No.: 16/944,628

(22) Filed: Jul. 31, 2020

(65) Prior Publication Data

US 2020/0372821 A1   Nov. 26, 2020

Related U.S. Application Data

(60) Provisional application No. 62/844,219, filed on May 7, 2019.

(51) Int. Cl.
  *G09B 9/00*    (2006.01)
  *G09B 19/00*   (2006.01)
  *G06F 3/0482*  (2013.01)
  *G06T 19/00*   (2011.01)

(52) U.S. Cl.
  CPC .............. *G09B 9/00* (2013.01); *G09B 19/00* (2013.01); *G06F 3/0482* (2013.01); *G06T 19/00* (2013.01)

(58) Field of Classification Search
  CPC ....................................................... G09B 9/00
  USPC ....................................................... 434/236
  See application file for complete search history.

(56) References Cited

U.S. PATENT DOCUMENTS

| | | | |
|---|---|---|---|
| 2018/0091448 A1* | 3/2018 | Breedvelt-Schouten | H04L 51/216 |
| 2018/0091450 A1* | 3/2018 | Breedvelt-Schouten | H04L 51/04 |
| 2018/0307844 A1* | 10/2018 | Kras | H04L 63/104 |
| 2019/0164448 A1* | 5/2019 | Canton | A61B 90/37 |
| 2019/0283248 A1* | 9/2019 | Guerin | B25J 9/1605 |
| 2019/0347547 A1* | 11/2019 | Ebstyne | G06V 20/00 |
| 2020/0349751 A1* | 11/2020 | Bentovim | G09B 5/06 |
| 2020/0372821 A1* | 11/2020 | Mercer | G06F 3/0488 |
| 2021/0304706 A1* | 9/2021 | Petrangeli | G06F 16/487 |
| 2021/0320999 A1* | 10/2021 | Johnson | H04M 3/5191 |
| 2022/0036761 A1* | 2/2022 | Ware | G06F 3/011 |
| 2022/0067552 A1* | 3/2022 | Kritzinger | G06F 16/176 |

* cited by examiner

Primary Examiner — Reza Nabi
(74) Attorney, Agent, or Firm — Schott, P.C.

(57) ABSTRACT

The system and method herein provide immersive training using virtual reality technologies used to provide any desired type of immersive training. The training may focus on sexual harassment issues. Some training may focus on the "feeling" of the situation, and it has been found that virtual reality environments described herein provide a particularly effective way of training on the feeling of the situation and related issues in the sexual harassment context.

17 Claims, 16 Drawing Sheets

Fig. 6 (two parts)

Fig. 12

SERVER, SYSTEM, AND METHOD FOR IMMERSIVE TRAINING

BACKGROUND

Training employees and others is an increasingly important responsibility faced by virtually all organizations. Some training is performed well using conventional methods. Other training needs are poorly served by conventional training methods.

SUMMARY OF THE EMBODIMENTS

The system and method herein provide immersive training using virtual reality technologies used to provide any desired type of immersive training. The training may focus on sexual harassment issues. Some training may focus on the "feeling" of the situation, and it has been found that virtual reality environments described herein provide a particularly effective way of training on the feeling of the situation and related issues in the sexual harassment context.

The system may use a virtual reality environment in which users can receive a mobile phone shown in a user's hand. Unless otherwise noted, the system may refer to devices in virtual reality environments, although such descriptions do not limit the claims of the application. A UI overlay can be added to user's phone for messaging and haptic cues may be used for the user's phone.

A purple raindrop UI or other visual icon may indicate the selection a user has selected. In some embodiments, a double text confirmation allows the user to go back and select a new answer if needed, providing prompt and helpful feedback.

A white blinking light (at the top of the phone or similar) can give the user a cue that they should be using their phone. The light may speed up as the user nears their allotted period of time of their opportunity to act and/or intervene. Other embodiments can use other visual, audio or haptic cues to notify the user, which can help emphasize the importance of timely actions or interventions.

A plus "+" and minus "−" cue may visually show the user that they made the right or wrong choice or they may appear on the phone during an interaction.

Player/participant settings may be applied to a user's phone. The player setting may allow the user to set their phone setting to fit their comfort level and the user can move the phone closer, further away, up, down, and change the tilt and text size.

A tooltip UI can be applied to a user's phone and the tooltip UI may allow users to be reminded of how to use the phone during the training experience. The user can press a button on their controller to see what the buttons do inside the virtual world (overlaid on their phone). The user can select their phone input method to clicking and/or swiping.

Avatar hands via Avatar SDK using an Occulus can be described as nondescript hands, namely "ghost" hands. A developer can connect the hand to the controller for use of the Avatar SDK. Avatar SDK can contain haptics, and haptics can cue the user to look at their phone. In some embodiments, users can use VRTK. Haptics can be used with VRTK. The use of VRTK can allow for Vive and Oculus to work at the same time.

Combining haptic cues such as Avatar SDK or VRTK will add a visual cue on the user's screen "check your phone".

The "A" button stands for "yes" and the "B" button stands for "no". Alternatively, a user can swipe right for "yes" or left for "no" or any conventional gestures can be used to pick a response.

The user's phone can suggest up to four text choices and use of the Android 3D models may be available from the Asset Store.

UI screens can be used on the user's phone and a ringtone can cue a user to look down at their phone. The UI screens can alert the user "Your phone is ringing! Use your hand controller to pick it up."

BRIEF DESCRIPTION OF THE DRAWINGS

Other systems, methods, features, and advantages will be or will become apparent to one with skill in the art upon examination of the following figures and detailed description. It is intended that all such additional systems, methods, features, and advantages be included within this description, be within the scope, and be protected by the accompanying claims. Component parts shown in the drawings are not necessarily to scale and may be exaggerated to better illustrate the important features. In the drawings, like reference numerals designate like parts throughout the different views, wherein:

FIGS. 12 and 13 illustrate flow charts illustrating an interaction type according to the system.

DETAILED DESCRIPTION OF THE EMBODIMENTS

Hardware Introduction

The detailed description of exemplary embodiments herein makes reference to the accompanying drawings and pictures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
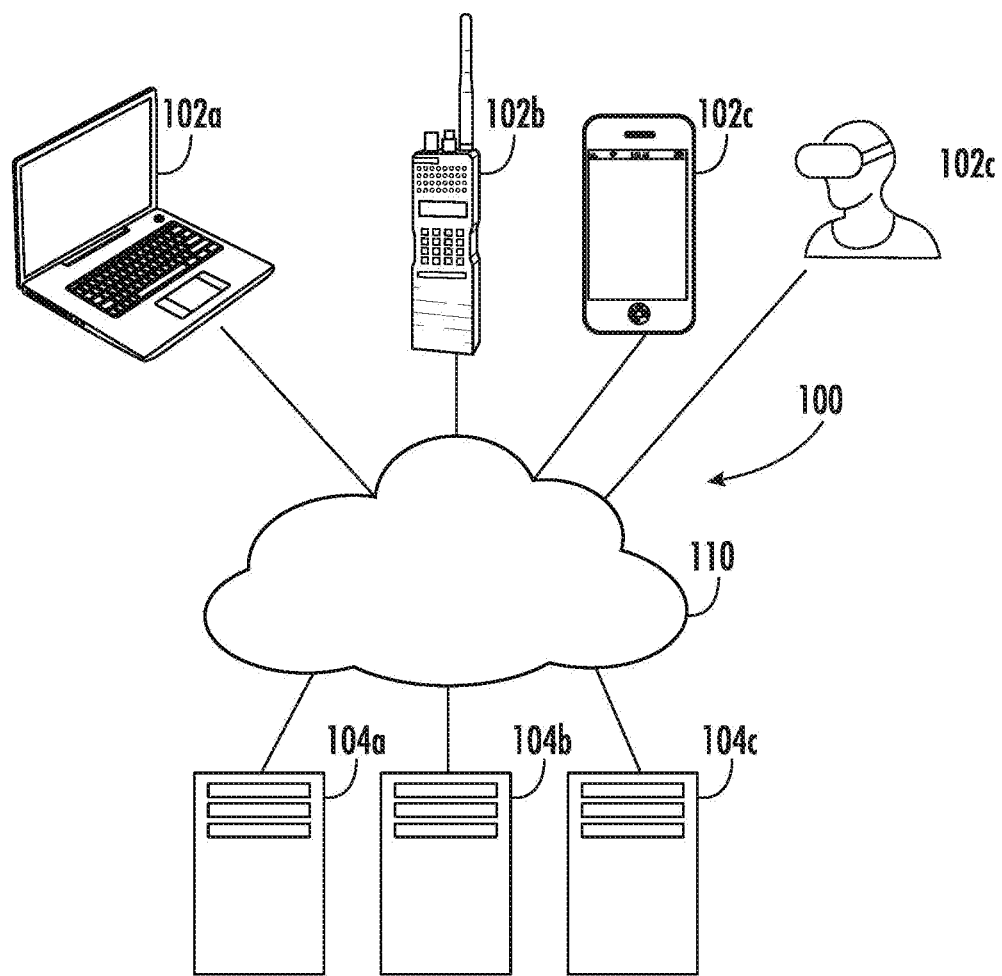
FIG. 1A shows a network diagram of different components of the system.

For example, FIG. 1A shows an embodiment of a network 100 with one or more clients 102a, 102b, 102c, 102d that may be local machines, personal computers, mobile devices, servers, tablets, or virtual reality (VR) headsets that communicate through one or more networks 110 with servers 104a, 104b, 104c. It should be appreciated that a client 102a-102d may serve as a client seeking access to resources provided by a server and/or as a server providing access to other clients.

The network 110 may be wired or wireless. If it is wired, the network may include coaxial cable, twisted pair lines, USB cabling, or optical lines. The wireless network may operate using BLUETOOTH, Wi-Fi, Worldwide Interoperability for Microwave Access (WiMAX), infrared, or satellite networks. The wireless links may also include any cellular network standards used to communicate among mobile devices including the many standards prepared by the International Telecommunication Union such as 3G, 4G, and LTE. Cellular network standards may include GSM, GPRS, LTE, WiMAX, and WiMAX-Advanced. Cellular network standards may use various channel communications such as FDMA, TDMA, CDMA, or SDMA. The various networks may be used individually or in an interconnected way and are thus depicted as shown in FIG. 1A as a cloud.

The network 110 may be located across many geographies and may have a topology organized as point-to-point, bus, star, ring, mesh, or tree. The network 110 may be an overlay network which is virtual and sits on top of one or more layers of other networks.

In most cases, every device on a network has a unique identifier. In the TCP/IP protocol, the unique identifier for a computer is an IP address. An IPv4 address uses 32 binary bits to create a single unique address on the network. An IPv4 address is expressed by four numbers separated by dots. Each number is the decimal (base-10) representation for an eight-digit binary (base-2) number, also called an octet. An IPv6 address uses 128 binary bits to create a single unique address on the network. An IPv6 address is expressed by eight groups of hexadecimal (base-16) numbers separated by colons.

An IP address can be either dynamic or static. A static address remains constant for a system unless modified by a user. Dynamic addresses are assigned by the Dynamic Host Configuration Protocol (DHCP), a service running on the network. DHCP typically runs on network hardware such as routers or dedicated DHCP servers.

Dynamic IP addresses are issued using a leasing system, meaning that the IP address is only active for a limited time. If the lease expires, the computer will automatically request a new lease. Sometimes, this means the computer will get a new IP address, too, especially if the computer was unplugged from the network between leases. This process is usually transparent to the user unless the computer warns about an IP address conflict on the network (two computers with the same IP address).

Another identifier for a device is the hostname. A hostname is a human-readable label assigned to a device and can be modified by a user. Hostname can be resolved to the IP address of the device. This makes hostname a more reliable device identifier in a network with dynamic IP addresses.

Information in the IP Address may be used to identify devices, geographies, and networks. The hostname may be used to identify devices.

A system may include multiple servers 104a-c stored in high-density rack systems. If the servers are part of a common network, they do not need to be physically near one another but instead may be connected by a wide-area network (WAN) connection or similar connection.

Management of group of networked servers may be de-centralized. For example, one or more servers 104a-c may include modules to support one or more management services for networked servers including management of dynamic data, such as techniques for handling failover, data replication, and increasing the networked server's performance.

The servers 104a-c may be file servers, application servers, web servers, proxy servers, network appliances, gateways, gateway servers, virtualization servers, deployment servers, SSL VPN servers, or firewalls.

When the network 110 is in a cloud environment, the cloud network 110 may be public, private, or hybrid. Public clouds may include public servers maintained by third parties. Public clouds may be connected to servers over a public network. Private clouds may include private servers that are physically maintained by clients. Private clouds may be connected to servers over a private network. Hybrid clouds may, as the name indicates, include both public and private networks.

The cloud network may include delivery using IaaS (Infrastructure-as-a-Service), PaaS (Platform-as-a-Service), SaaS (Software-as-a-Service) or Storage, Database, Information, Process, Application, Integration, Security, Management, Testing-as-a-service. IaaS may provide access to features, computers (virtual or on dedicated hardware), and data storage space. PaaS may include storage, networking, servers or virtualization, as well as additional resources such as, e.g., the operating system, middleware, or runtime resources. SaaS may be run and managed by the service provider and SaaS usually refers to end-user applications. A common example of a SaaS application is SALESFORCE or web-based email.

A client 102a-d may access IaaS, PaaS, or SaaS resources using preset standards and the clients 102a-c may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1B:
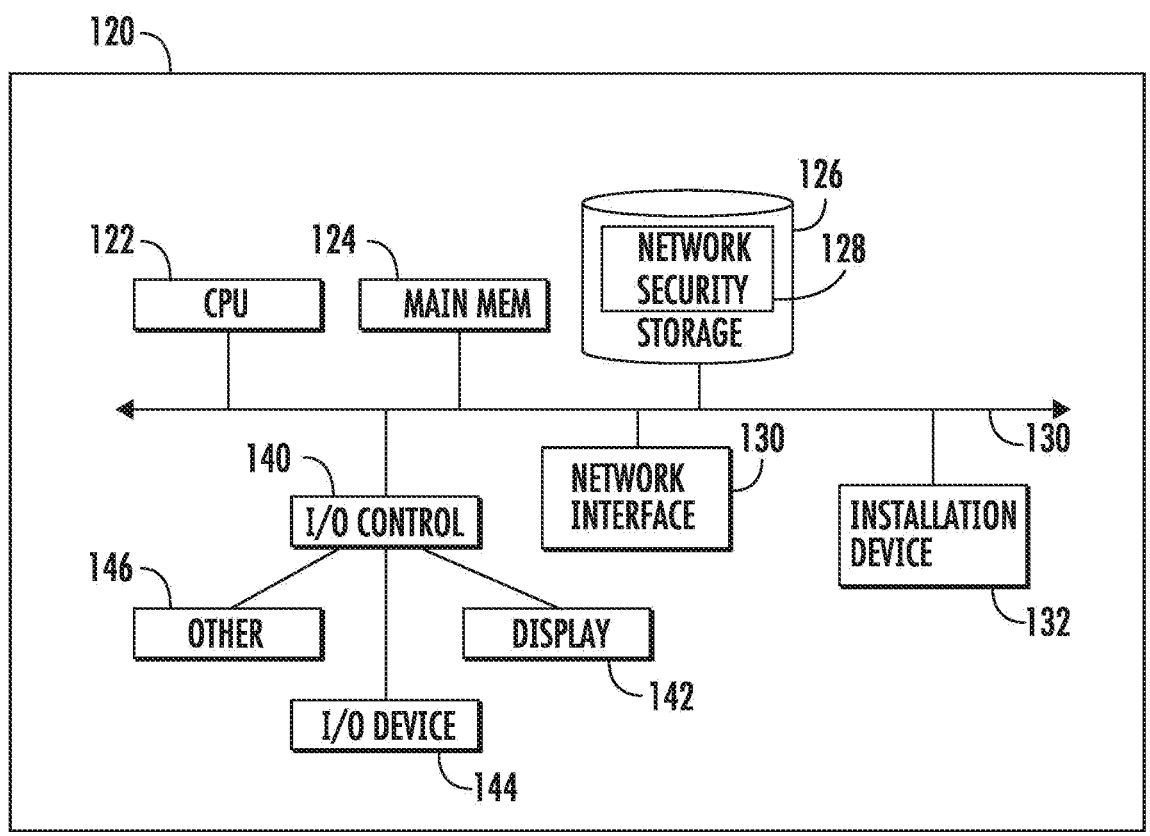
FIG. 1B certain hardware components for use with the system.

The clients 102a-d and servers 104a-c may be embodied in a computer, network device or appliance capable of communicating with a network and performing the actions herein. FIGS. 1A and 1B show block diagrams of a computing device 120 that may embody the client or server discussed herein. The device 120 may include a system bus 150 that connects the major components of a computer system, combining the functions of a data bus to carry information, an address bus to determine where it should be sent, and a control bus to determine its operation. The device includes a central processing unit 122, a main memory 124, and storage device 124. The device 120 may further include a network interface 130, an installation device 132 and an I/O control 140 connected to one or more display devices 142, I/O devices 144, or other devices 146 like mice and keyboards.

The storage device 126 may include an operating system, software, and a network user behavior module 128, in which may reside the network user behavior system and method described in more detail below.

The computing device 120 may include a memory port, a bridge, one or more input/output devices, and a cache memory in communication with the central processing unit. The central processing unit 122 may be a logic circuitry such as a microprocessor that responds to and processes instructions fetched from the main memory 124. The CPU 122 may use instruction level parallelism, thread level parallelism, different levels of cache, and multi-core processors. A multi-core processor may include two or more processing units on a single computing component.

The main memory 124 may include one or more memory chips capable of storing data and allowing any storage location to be directly accessed by the CPU 122. The main memory unit 124 may be volatile and faster than storage memory 126. Main memory units 124 may be dynamic random access memory (DRAM) or any variants, including static random access memory (SRAM). The main memory 124 or the storage 126 may be non-volatile.

The CPU 122 may communicate directly with a cache memory via a secondary bus, sometimes referred to as a backside bus. In other embodiments, the CPU 122 may communicate with cache memory using the system bus 150. Cache memory typically has a faster response time than main memory 124 and is typically provided by SRAM or similar RAM memory.

Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, 3D printers, and VR headsets.

Additional I/O devices may have both input and output capabilities, including haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures.

In some embodiments, display devices 142 may be connected to the I/O controller 140. Display devices may include liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, VR or 3D displays.

The computing device 120 may include a network interface 130 to interface to the network 110 through a variety of connections including standard telephone lines LAN or WAN links (802.11, T1, T3, Gigabit Ethernet), broadband connections (ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols. The computing device 120 may communicate with other computing devices via any type and/or form of gateway or tunneling protocol such as Secure Socket Layer (SSL) or Transport Layer Security (TLS). The network interface 130 may include a built-in network adapter, network interface card, PCMCIA network card, EXPRESSCARD network card, card bus network adapter, wireless network adapter, USB network adapter, modem or any other device suitable for interfacing the computing device 120 to any type of network capable of communication and performing the operations described herein.

The computing device 120 may operate under the control of an operating system that controls scheduling of tasks and access to system resources. The computing device 120 may be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computer system 120 can be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication.

The status of one or more machines 102a-c, 104a-c may be monitored, generally, as part of network management. In one of these embodiments, the status of a machine may include an identification of load information (the number of processes on the machine, CPU and memory utilization), of port information (the number of available communication ports and the port addresses), session status (the duration and type of processes, and whether a process is active or idle), or as mentioned below. In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

The System and Method

User experiences within an input/output device like a VR headset may be built around one topic grouped under modules. Some examples include: Topic 1: Identification of Sexual Harassment has three experiences; Topic 2: Bystander Intervention has three experiences; Topic 3: Empathy & Bias has three experiences; Topic 4: Response, Reporting & Retaliation has three experiences. In some embodiments, there are a total of twelve experiences with 120 minutes of content, four interaction types and scoring systems.

Figure 2:
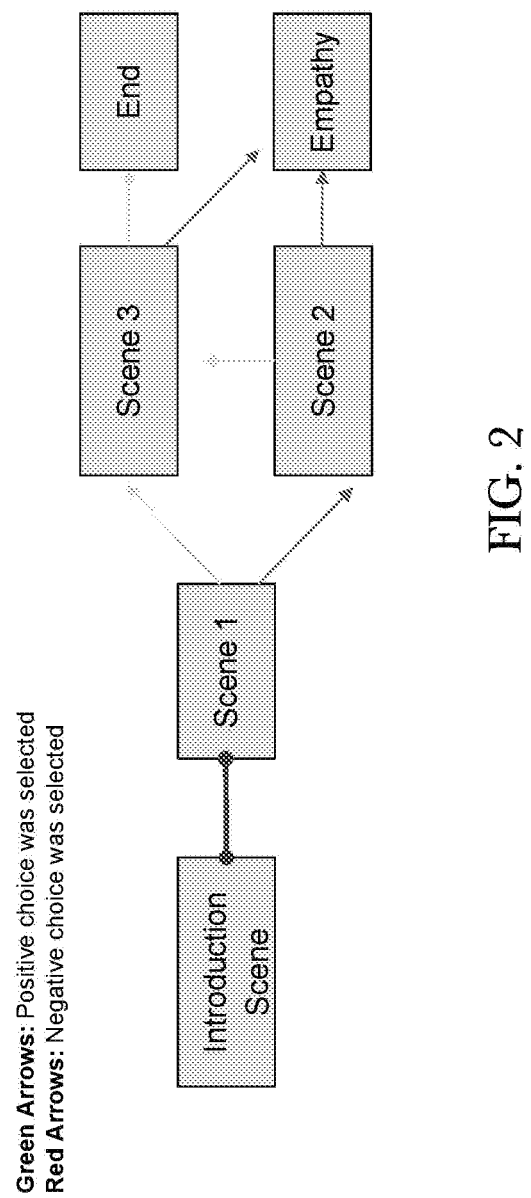
FIGS. 2-3 illustrate flow charts illustrating the branching score system.
Figure 3:
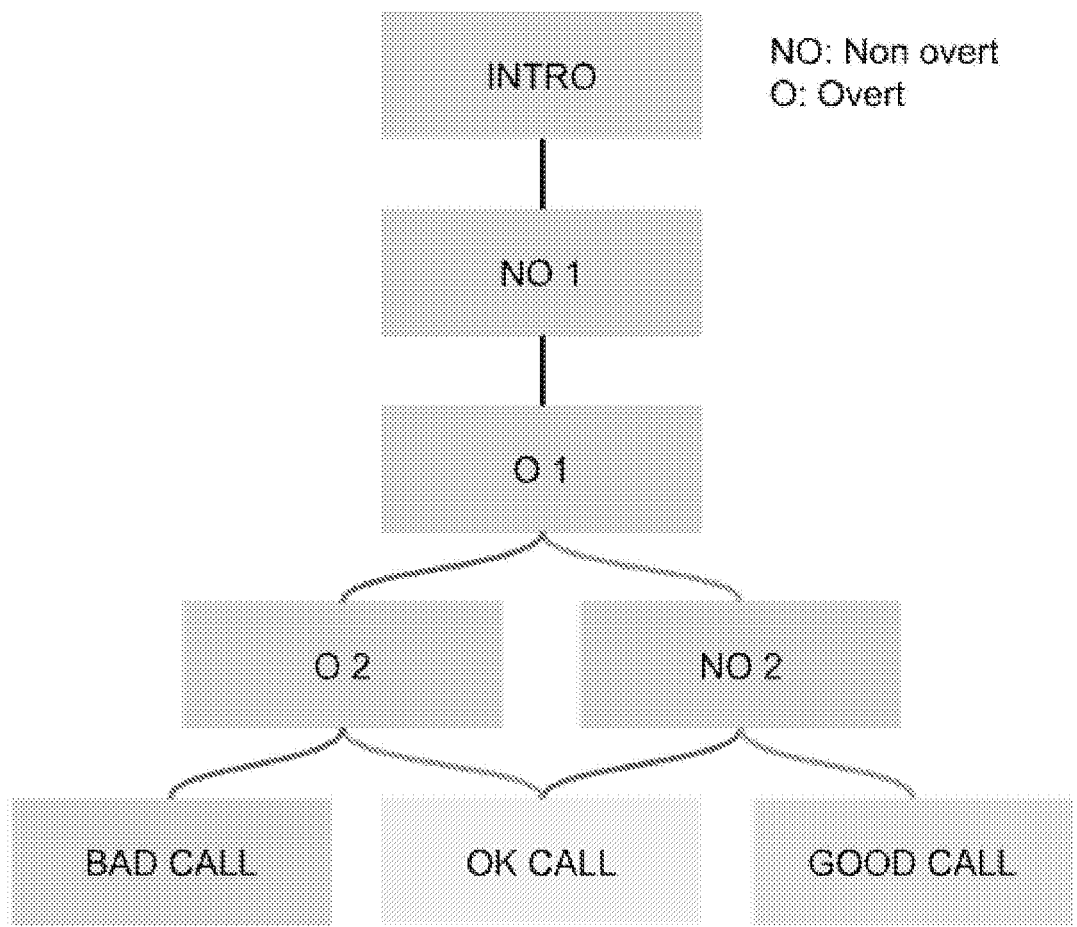

FIGS. 2-3 illustrate flow charts showing the branching score system.

FIG. 2 for example shows an overview of a scene selection scenario that starts with an introduction scene leading into a content scene 1 that may present a user with two choices around a situation involving, for example, workplace harassment. The system may present the user with two choices: a right choice (lighter shaded arrows) or a wrong choice (darker). Each choice leads to a different follow-up scene (or previous scene) and only the right combination of correct choices leads to the terminal end scene that closes a particular scene.

The system may provide the user can with a branching scoring system on their phone and of course, the introduction scene may be optional and simply to help the user acclimate to using the phone interface and to get an early assessment of the user's response to the environment. The choice branching may be scored using a scoring system of +2, +1, −2, −1. For example: the scoring system for the introduction scene may comprise of the following options: Option A: −2; Option B: +1; Option C: +2; and/or Option D: −1, where the user's total journey to the end scene may receive a composite score that is the total of all the choices made. Obviously, there may be more choices and paths than shown in the figures.

FIG. 3 shows another branching scoring scenario using certain overt and non-overt decision points. An overt decision branch may present a clear decision (harass vs not harass) while a non-overt decision may provide a decision where there are less clear alternatives: terminate a problem employee vs. work to reform a troubled employee's behavior. Other decision points, like NO 1, may not lead to more than one next scene, and instead may be used just to develop an overall score for the user.

Figure 4:
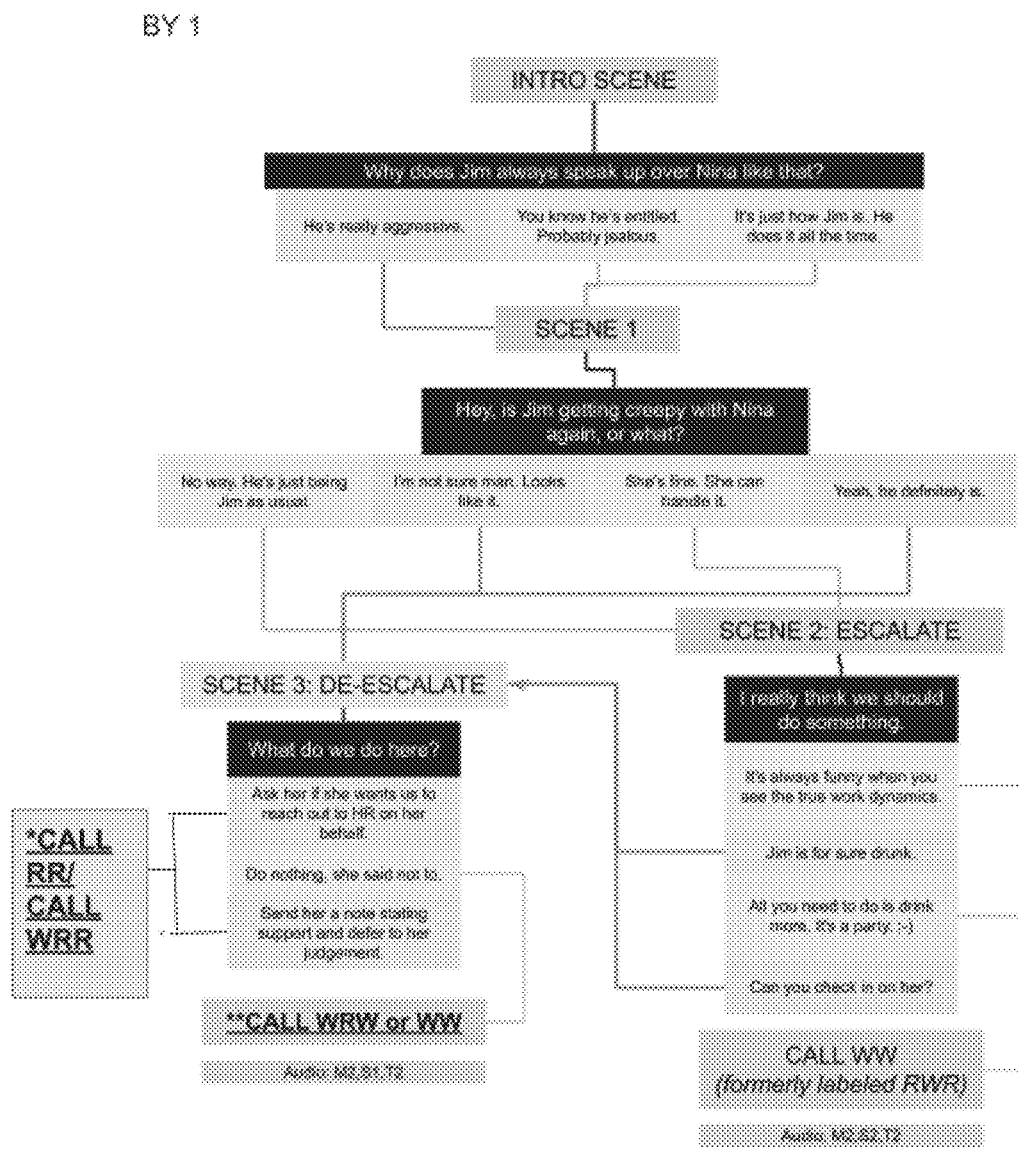
FIGS. 4-9 illustrate flow charts illustrating scenes of storylines according the system.
Figure 5:
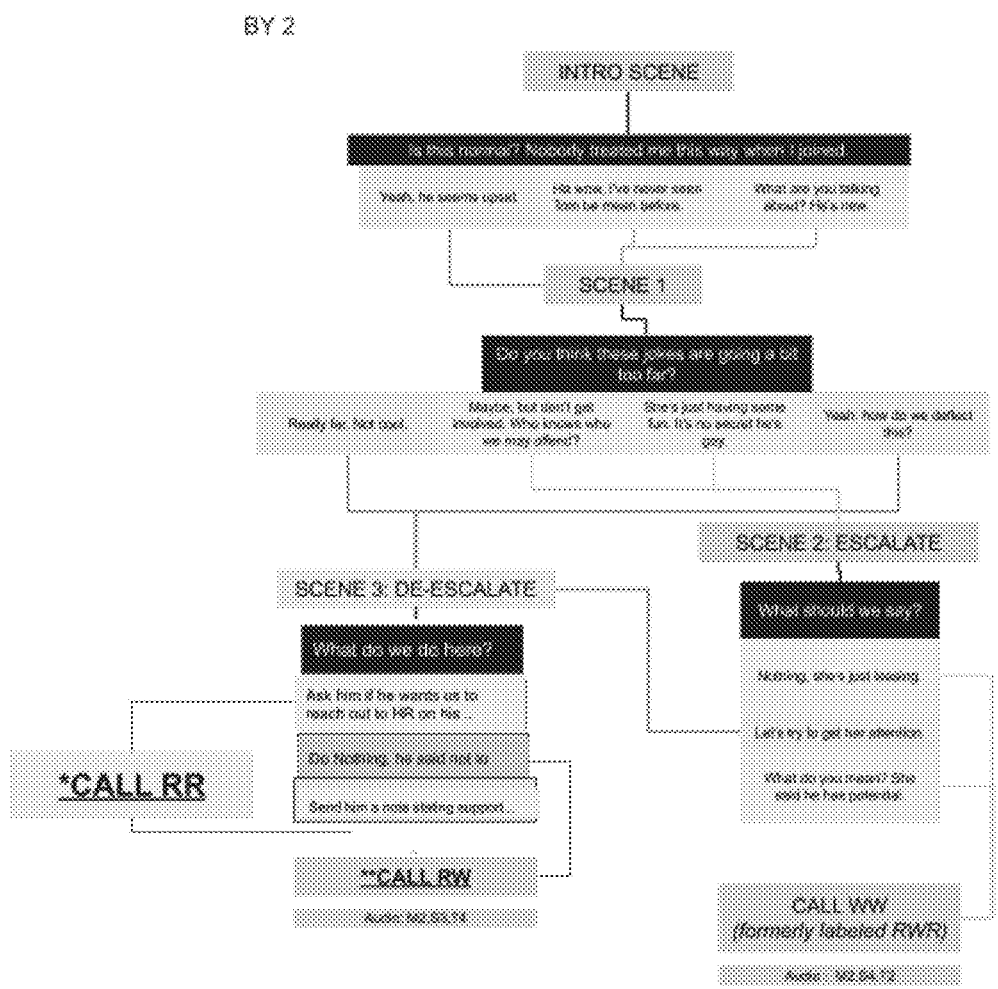
Figure 6:
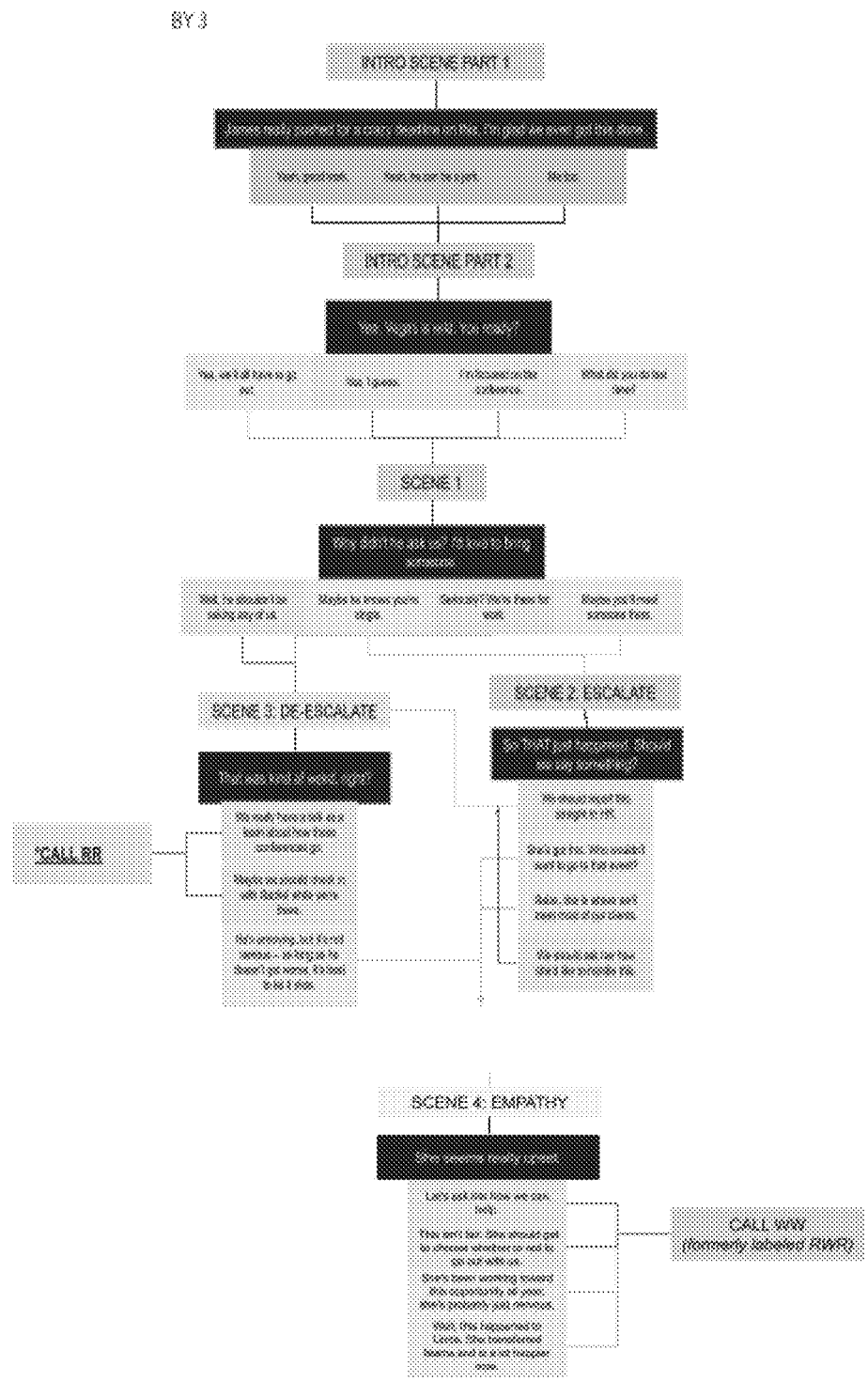
Figure 7:
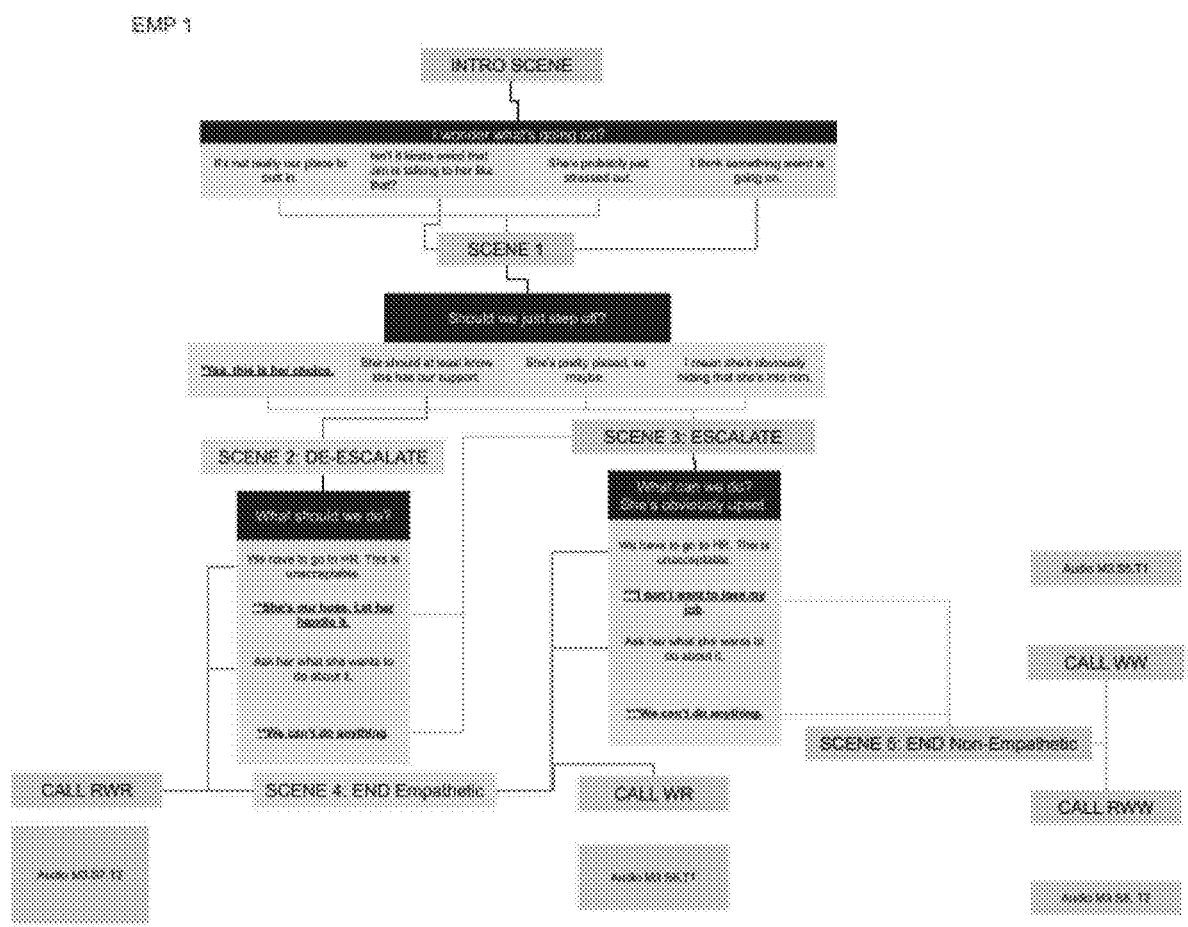
Figure 8:
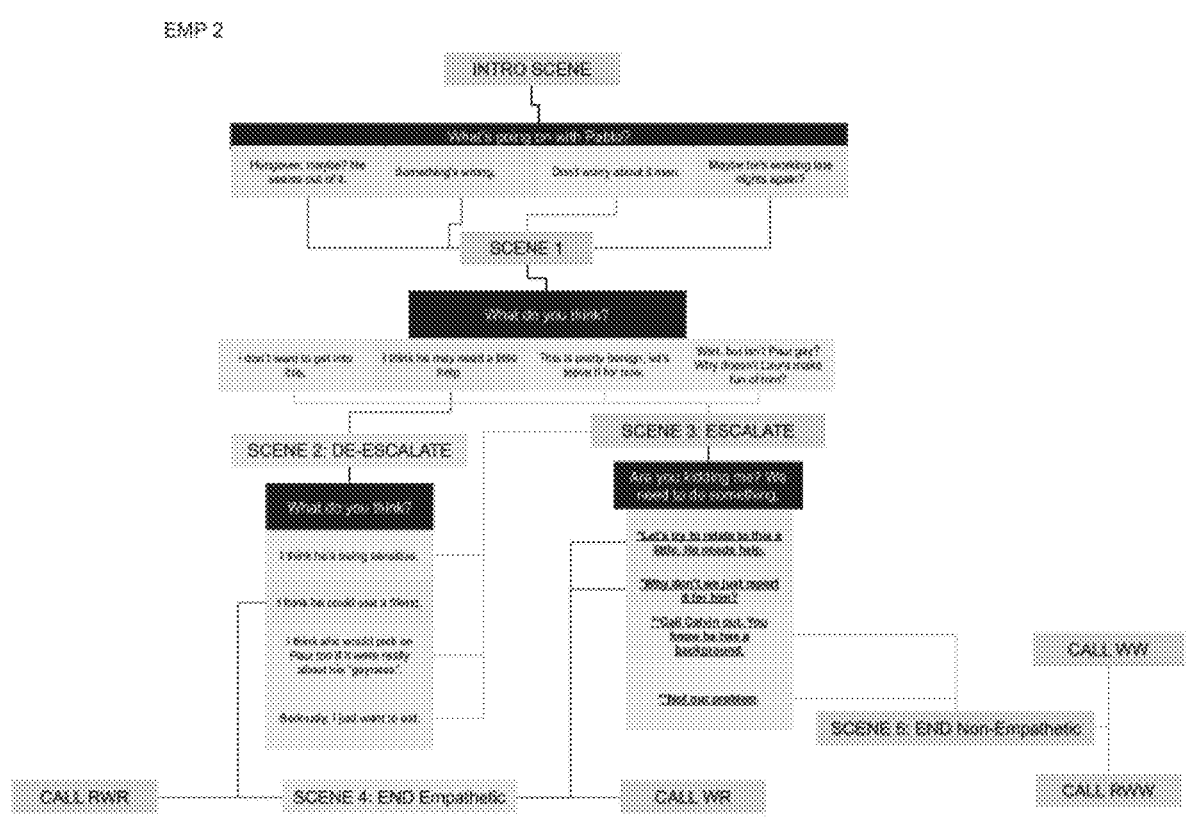
Figure 9:
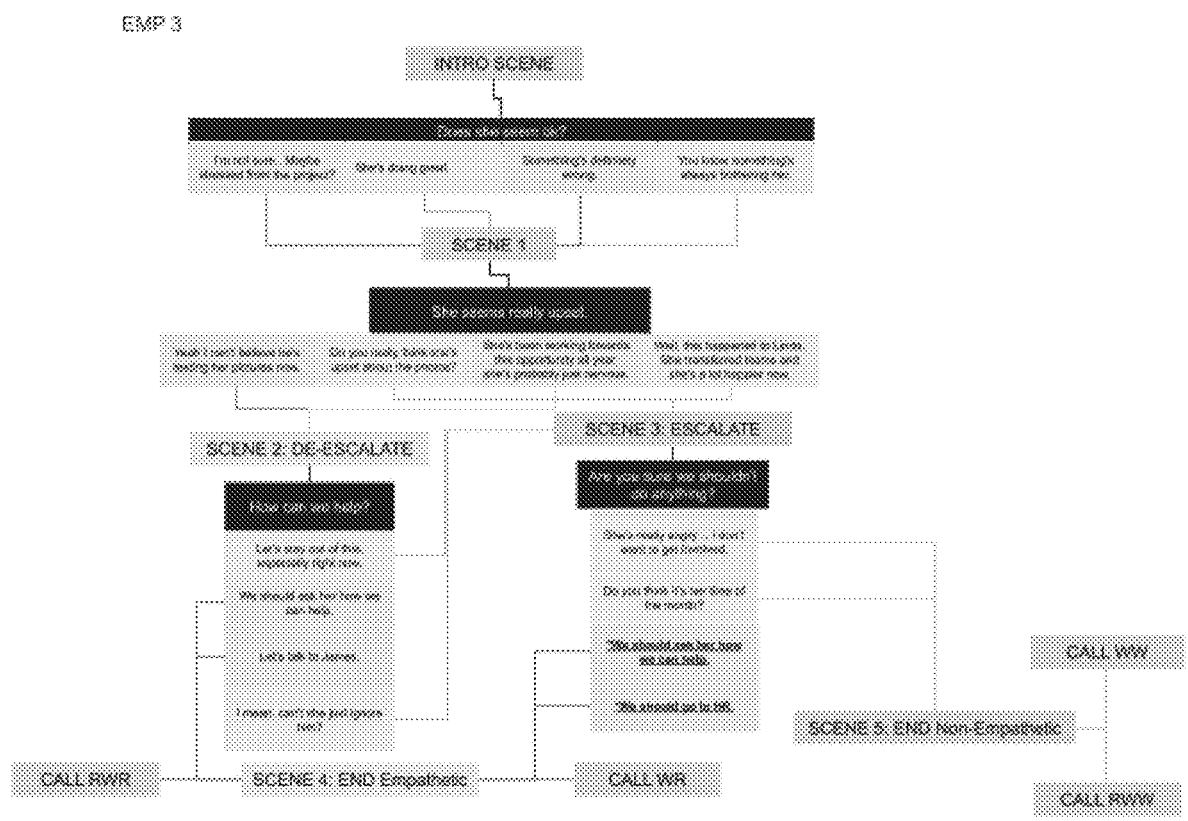

FIGS. 4-5 illustrate flow charts illustrating positive and negative branches within an actual example using the scoring system inside a storyline. In some embodiments, there are positive and negative branches for each storyline. In some embodiments, the storyline can change positively (+1, +2) or negatively (−1, −2). In some embodiments, the negative branch can move to an escalation scene where the storyline gets worse. In some embodiments, the positive branch can move to a de-escalation scene where the storyline gets better. In some embodiments, there are no overtly correct or incorrect choices.

FIGS. 6-9 illustrate flow charts illustrating scenes of storylines. In some embodiments, scenes 1-3 can branch according to what the user selects in the previous/subsequent scene. For example: if the user selects a negative choice in scene 1, they will see an escalation scene which moves the user to scene 2. The user may select a positive choice in scene 1 and this may lead to the user viewing a de-escalation scene that moves the user to scene 3. The user in scene 3 may view an Empathy scene or an End scene. But the user in scene 2 can view either Scene 3 or the Empathy scene. The Empathy scenes may be used is to assess a users' level of empathy using the scoring system The scoring and branching system of scene 1 can comprise of the following options: Option A: +2, Option B: −1, Option C: +1, and/or Option D: −2 and the scoring and branching system for the Empathy scene can comprise of the following options: Option A: +2, Option B: +1, Option C: −1, and/or Option D: −2. At the end of a full scenario, the user may receive both a decision score indicating whether they made the right choices, and/or an empathy score noting their ability to behave empathically. Scores may be benchmarked across one or multiple organizations anonymously to help highlight high and low performing talent as well as drive predictive analytics for organizations within similar industries, sizes, or locations.

The phone input mechanism, which may be seen as a visible phone within the interactive environment inside the VR, can feature five interaction types: 1. Text Message (no scoring); 2. Text Message/Phone Call (scoring); 3. Phone Call (no scoring); 4. Tablet Y/N (no scoring); or 5. Text Message (combination scoring). A text message is a form of an interaction type. The user, at pre-specified intervals, may receive a text message from another user within the experience if the experience is multiuser, or the other user could be an NPC. The suggested responses may appear on the user's phone and/or the user can select one of the suggested responses. Each response may have a score associated to it within the system/program and the selected response to the text message can determine where the story branches to in terms of the video(s) and scenes next presented.

Figure 10:
FIGS. 10-11 illustrate a user's keypad with suggested responses according the system.
Figure 11:

FIGS. 10-11 illustrate a user's phone screen, which may present two or more suggested responses for the user to make, which responses may include cues and interactivity. The user may have two choices that appear on the keypad of their phone including a presentation of choices in which the left side of the users screen can show a "no" response, for example: "I don't think so . . . ", and the right side of the users screen can show a "yes" response, for example: "That's a good idea."

Figure 12:
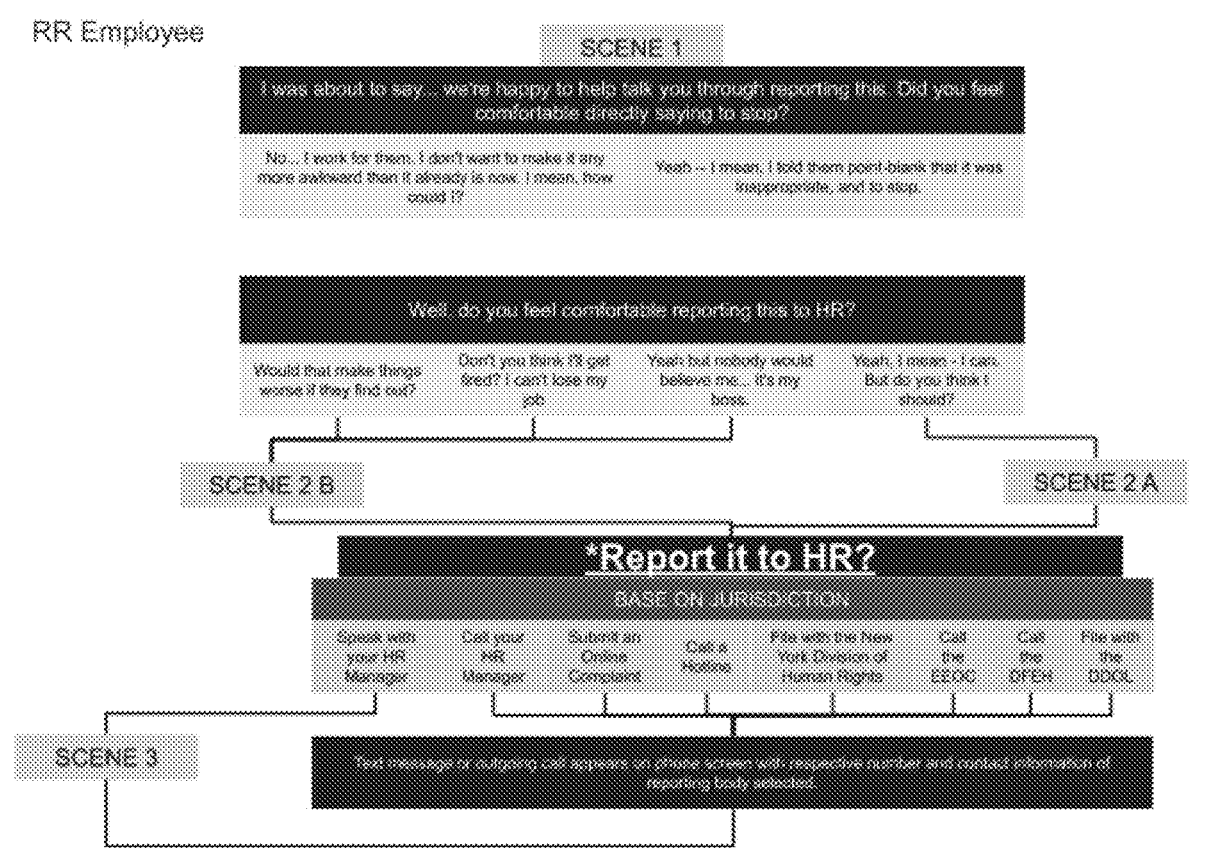
Figure 13:
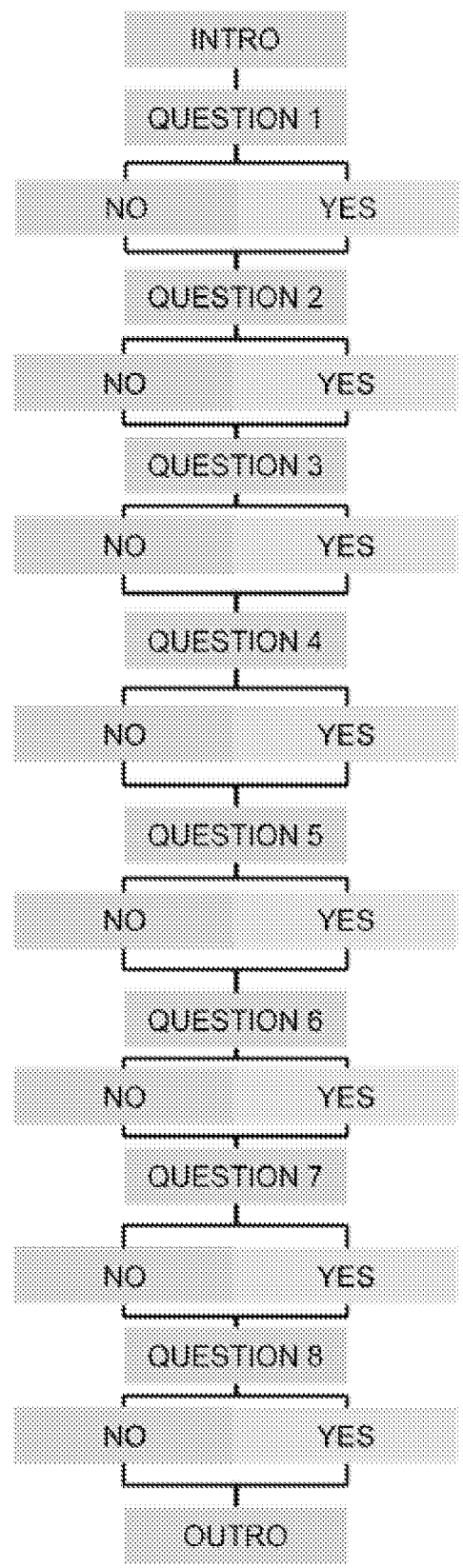

FIGS. 12 and 13 illustrate flow charts showing an interaction type in which a text message or phone call is a form of an interaction type within the virtual environment. In these, the user may have an allotted period of time to report a behavior to Human Resources via a phone call. Human Resources may discuss what the behavior was with the user, and the user may select the text message which is most relevant to what the user thinks the behavior is. If the user makes the right selection, the user may receive positive feedback from Human Resources and will be given a +1 point. If the user that makes the wrong selection, the user may receive a call from Human Resources detailing what the behavior is. If the user that makes the wrong selection, they may be given a −1 point. Finally, if the user fails to call Human Resources within the allotted period of time, the user will receive a call from Human Resources. The user's score at the end of this interaction, will either receive positive, negative, or neutral feedback prior to continuing to the next set of experiences. This score may be shared within the VR environment or it may be only transmitted to a third party.

As mentioned, a phone call may be a form of an interaction type. In some scenarios, the user may be prompted to practice reporting harassment by a colleague and the user is given a phone with 4-5 departmental or other agencies to call. The departmental agencies may change depending on the location in which the user is based and the server may send the location of the user to the system based on the user's employee profile and office location. Based on their actions, the user may hear specific feedback from that departmental agency on the reporting process.

Figure 14:
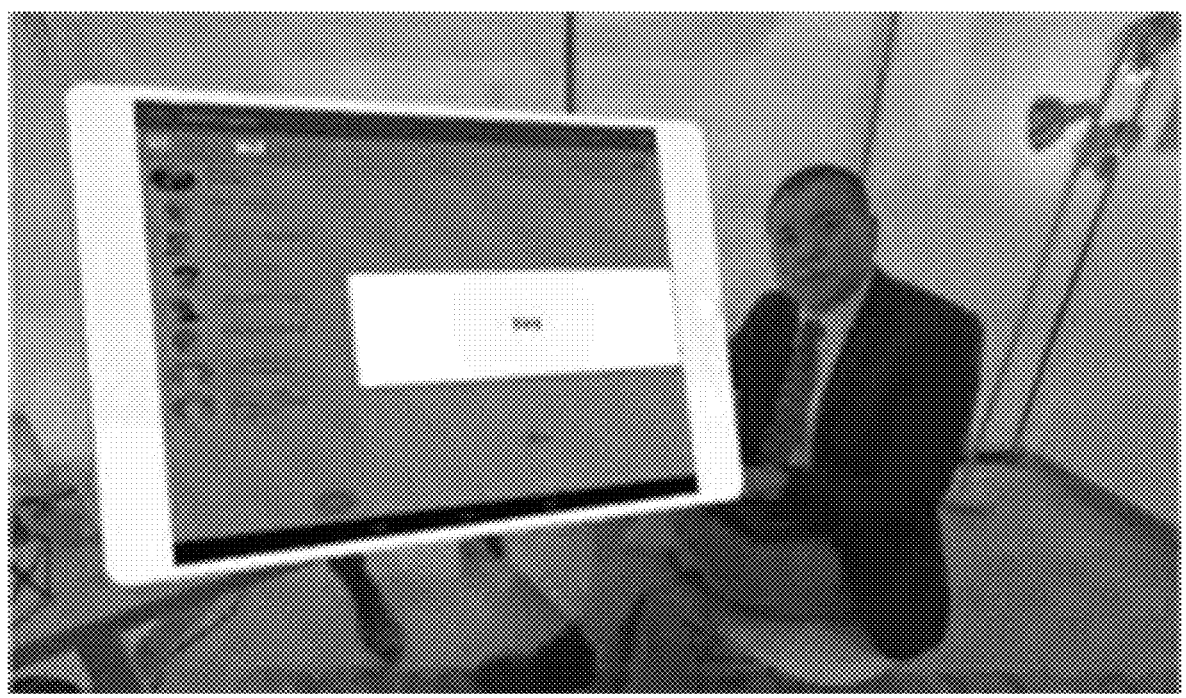
FIG. 14 illustrates an interaction type in accordance with the system

FIG. 14 illustrates an interaction type in accordance with some embodiments. In some embodiments, a tablet interface is another form of an interaction type. In some embodiments, the user can select "yes" and "no" to respond to questions the user is prompted with.

The branching scoring system may depend on the interaction type. For example, the scoring system may be tied to a tagging system and the system measures the score per tag on a users' phone. For example, certain behavior types reflected as interactions the user chooses may be tagged as "misogynistic," which can yield a user's score later on tagged scores like misogamy, racism, ageism, responsiveness. See below regarding interaction points.

The scoring system for a text message interaction type (interaction type number one) may include a +2, +1, −2, −1 (or 0-5 as shown in FIG. 17) scoring system and when the scoring system for a text message interaction type is number one, the storyline changes either positively (+1, +2), negatively (−1, −2), or neutral (0). Storylines with a "Positive" or "Negative" or "Neutral" score may end with an audio call regardless of the user's overall score.

Heatmaps may be added to the answer choices and such heatmaps may provide an amount of time users are engaging with each of the respective choices before making their decision. In some embodiments, the heatmaps are used in analytics. Calculation of the response time along with accuracy may be used in the analytics and the branching structure can include more options for user feedback. The branching structure may include a wide variety of end audio feedback calls that the user can hear based on his/her choices.

Interaction points ("IPs") may be tied to a behavioral choice tag (i.e. aggression vs. assertion, empathy, misogyny, etc.) to quantify a user's ability to respond to problems at a granular topic-facing scale. The interaction points may be used in the analytics system.

The scoring system for the text message or phone call interaction type can be interaction type number two. The user may be granted a +1 when they make the correct choice. In some embodiments, the user is granted a −1 when they make an incorrect choice. In some embodiments, when a −1 answer is chosen, the story branches negatively. In some embodiments, when a +1 answer is chosen, the story branches positively. In some embodiments, the user will receive a call based on their final score. In some embodiments, the users final score is not dependent on how the storyline branched.

When a correct choice is made, the user may see a "+" sign appear on their phone. In some embodiments, when an incorrect choice is made, the user will see a "−" sign appear on their phone. Within a reporting window, the user may receive notifications about their score and progress.

In some embodiments, no scoring system is applied to control the content of a phone call interaction type (interaction type number three).

In some embodiments, no scoring system is applied for the tablet "yes/no" interaction type (interaction type number four). In some embodiments, feedback is built in via 360 video content. In some embodiments, no audio content or points system is used. In some embodiments, scores of "+1" and "−1" are used to measure accuracy for analytics.

In some embodiments, a combination of four scores may be applied when answers are selected. Each selected answer in the training assigns the trainee a score of 0-5 in categories such as Rationalization, Gaslighting, Harassment Identification, and Harassment Type Identification, Racism, Bias, for example.

Figure 15:
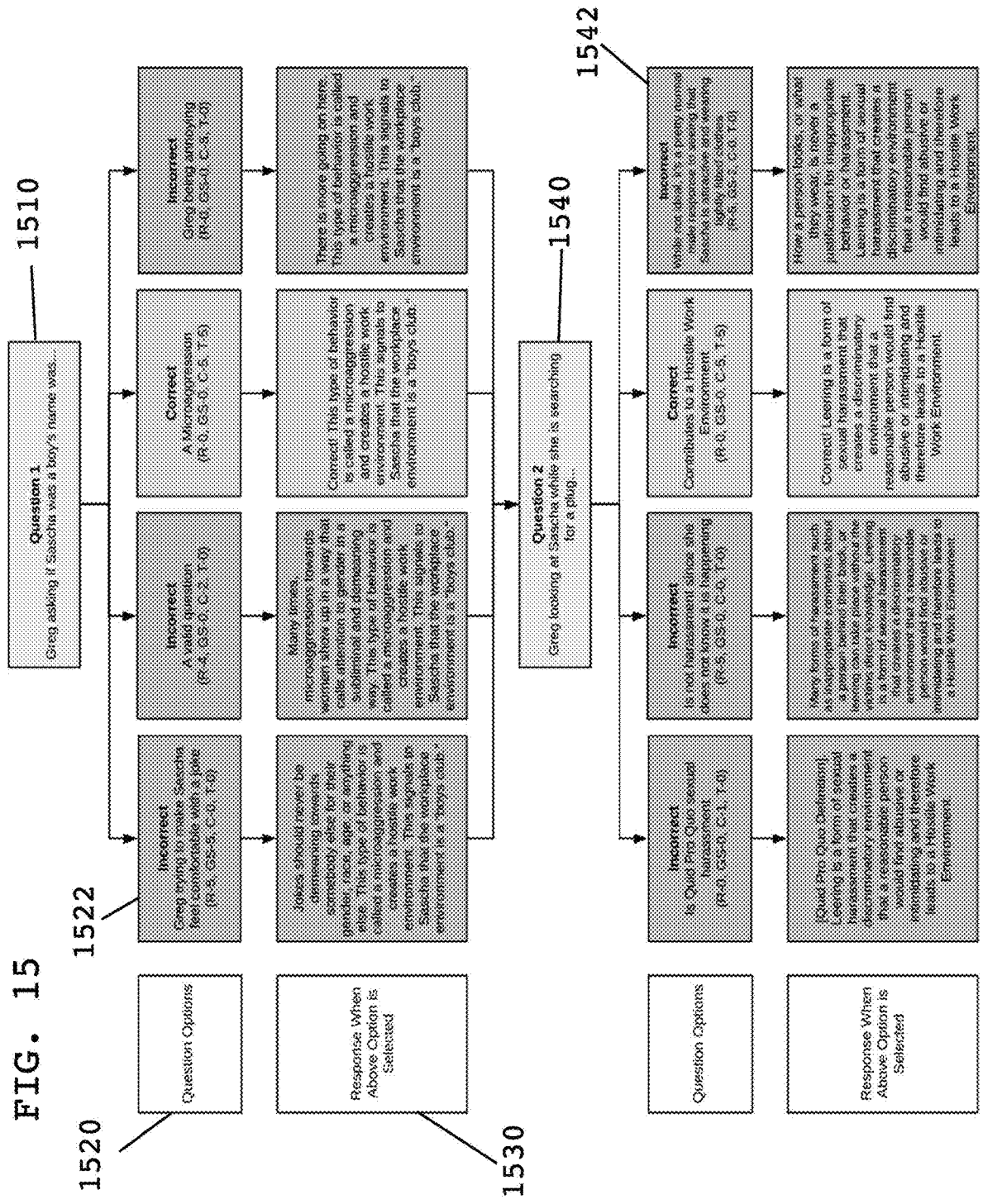
FIG. 15 show another flow chart through scenarios and scoring within the system.

FIG. 15 shows a stepwise scoring example. In it, the system shows a user (Greg) a video where he asks a colleague if Sascha was a boy's name, and then the system may ask the user a question 1510, in this case presenting 4 options 1520. Each option presents some tempting answer, with each answer having scores across problematic behaviors like Rationalization, Gaslighting, Harassment Identification, and Harassment, with the correct answer having the highest composite score.

The user's answer may prompt the system to present a teaching response with explanation/teaching 1530, and also record their score in each category. When presented with two questions, 1510, 1540 in sequence, in which the user selects two answers 1522, 1542, The user grows a composite score: Rationalization—10, Gaslighting—7, Harassment ID—0, and Harassment 0, which may, after many questions, create an overall user score to suggest areas in need of more training and development. This ongoing score may also be used to present further questions and scenarios to the user until their scores start to improve, that is, if a user has trouble identifying gaslighting behavior, they may need more of those scenarios until an understanding and identification of gaslighting is clear.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

The previous description of the disclosed examples is provided to enable any person of ordinary skill in the art to make or use the disclosed methods and apparatus. Accordingly, the terminology employed throughout should be read in a non-limiting manner. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. Skilled artisans may implement the described functionality in varying ways for each particular application, but such implementation decisions should not be interpreted as causing a departure from the scope of the disclosed apparatus and/or methods.

While the invention has been described with reference to the embodiments above, a person of ordinary skill in the art would understand that various changes or modifications may be made thereto without departing from the scope of the claims.

The invention claimed is:

1. An immersive virtual reality training system comprising:
  an output device that projects interactive scene selection scenarios, wherein each of the scene selection scenarios present at least two choices to a user;
  an input device, wherein the input device receives input relevant to the two choices, wherein the system presents further scenes or scene selection scenarios based on the input; and
  a scoring system that assigns a score to each input, wherein the scoring system includes scores by category, wherein the categories are predetermined problematic behaviors, wherein the scoring system tracks a total score, wherein each of the choices includes a tag, wherein the tag is associated with the score and can generate a score per tag, wherein the tags include misogamy, racism, ageism, and responsiveness.

2. The immersive virtual reality training system of claim 1, wherein the output device is a virtual reality headset.

3. The immersive virtual reality training system of claim 2, wherein the input device are accessories to the virtual reality headset.

4. The immersive virtual reality training system of claim 2, wherein the input device reads hand gestures of a user.

5. The immersive virtual reality training system of claim 2, wherein the input device are accessories to the virtual reality headset.

6. The immersive virtual reality training system of claim 1, wherein the scoring system tracks a total score.

7. The immersive virtual reality training system of claim 6, wherein each of the choices includes a tag, wherein the tag is associated with the score and can generate a score per tag.

8. The immersive virtual reality training system of claim 7, wherein the tags include misogamy, racism, ageism, and responsiveness.

9. The immersive virtual reality training system of claim 1, wherein the input device is presented visually via the output device as a mobile phone.

10. The immersive virtual reality training system of claim 1, wherein the input device is presented visually via the output device as menu option.

11. The immersive virtual reality training system of claim 1, wherein in response to the input, the system provides a response in the form of a teaching relevant to the response.

12. The immersive virtual reality training system of claim 1, wherein the interactive scene selection scenario presents a user interaction type that allows the user to input their choice, wherein the user interaction type may be a virtual text message.

13. The immersive virtual reality training system of claim 1, wherein the interactive scene selection scenario presents a user interaction type that allows the user to input their choice, wherein the user interaction type may be a virtual tablet.

14. The immersive virtual reality training system of claim 1, wherein the interactive scene selection scenario presents a user interaction type that allows the user to input their choice, wherein the user interaction type may be a virtual phone call.

15. The immersive virtual reality training system of claim 1, wherein the interactive scene selection scenario presents a user interaction type that allows the user to input their choice, wherein the user interaction type may be through a text message.

16. The immersive virtual reality training system of claim 1, wherein the output device is a virtual reality headset.

17. An immersive virtual reality training system comprising:
  an output device that projects interactive scene selection scenarios, wherein each of the scene selection scenarios present at least two choices to a user;
  an input device, wherein the input device receives input relevant to the two choices, wherein the system presents further scenes or scene selection scenarios based on the input; and
  a scoring system that assigns a score to each input,
  wherein the scoring system includes scores by category, wherein the categories are predetermined problematic behaviors, wherein the scoring system tracks a total score, wherein each of the choices includes a tag, wherein the tag is associated with the score and can generate a score per tag, wherein the predetermined problematic behaviors are selected from a list consisting of rationalization, gaslighting, harassment identification, and harassment.

* * * * *